June 3, 1941.  J. F. WALLACE  2,244,135
PACKING STRUCTURE
Filed June 16, 1939

INVENTOR
JOHN F. WALLACE
BY
ATTORNEY

Patented June 3, 1941

2,244,135

UNITED STATES PATENT OFFICE 2,244,135

PACKING STRUCTURE

John F. Wallace, Shaker Heights, Ohio, assignor to The Cleveland Pneumatic Tool Company, Cleveland, Ohio, a corporation of Ohio Application June 16, 1939, Serial No. 279,395

1 Claim. (Cl. 288—5)

This invention relates broadly to packings, but more particularly to sleeve-shaped packings adapted to expand radially internally and externally for affording a fluid tight joint between two spaced telescoping elements.

One object of this invention is to produce a new and improved packing particularly adaptable for use in shock absorbing struts for airplanes for effecting a fluid tight joint between the telescoping cylinders.

Another object of this invention is to provide such a strut with a packing mounted between its telescoping cylinders and engageable by the strut-piston for limiting the extension strokes of the strut, the packing being constructed in a manner preventing its axial compression upon engagement by the strut-piston, thereby preventing excessive radial expansion of the packing and the consequential additional friction between the two telescoping cylinders.

Other objects and advantages ancillary to the foregoing reside in the specific construction and aggroupment of the elements peculiar to this structure, as will become apparent from a more complete examination of this specification.

Figure 1:
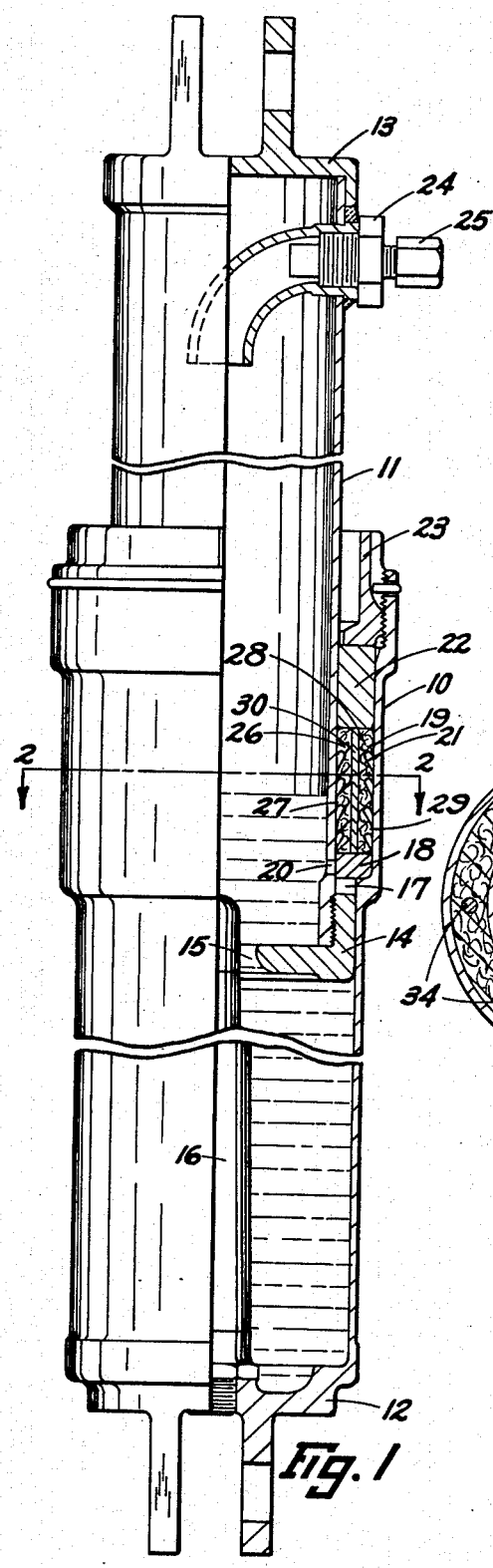
Fig. 1 is a side elevational view partly in section of a shock absorbing strut embodying the invention.
Figure 2:
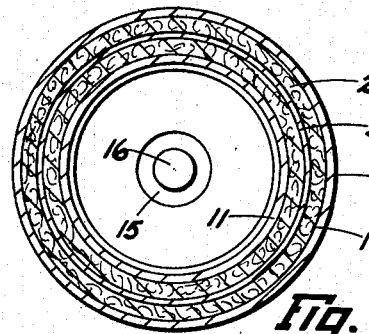
Fig. 2 is a cross sectional view taken in a plane indicated by line 2—2 in Fig. 1.
Figure 3:
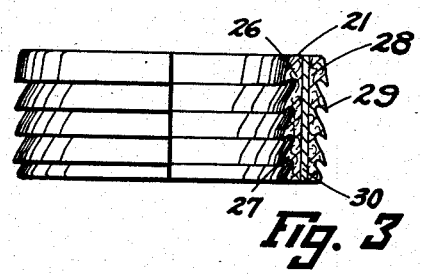
Fig. 3 is a side elevational view partly in section of the packing shown in Fig. 2.

Referring to the drawing, 10 and 11 represent the outer and inner cylinders respectively of a shock absorbing strut, the remote ends of the cylinders being closed, the outer one by a cap 12 and the inner one by a similar cap 13, through which caps the shock absorbing strut may be attached to the parts of an airplane whose relative movements are to be cushioned. On the inner end of the inner cylinder 11 is mounted a piston 14 slidably engaging the inner wall of the outer cylinder, which piston is formed with a central orifice 15 through which is free to slide a metering pin 16 carried by the closed end of the outer cylinder. In practice, the diameter of the inner cylinder 11 is materially smaller than that of the outer cylinder 10, thus normally forming between the two cylinders an annular chamber 17 closed at one end of the piston 14 and at the other end by a ring or retainer 18 resting on the bottom of a counterbore 19 forming the inner end of the outer cylinder. The annular chamber 17 is capable of communication with the interior of the inner cylinder 11 through one or more ports 20 extending through the inner cylinder adjacent the piston 14.

Resting on the retainer 18 within the counterbore 19, there is a sleeve-like packing 21 and a bushing 22 held against endwise movement by a nut 23 screwed within the upper end of the counterbore. The retainer 18 and bushing 22 are adequately machined to form sliding bearings for the inner cylinder.

Stored within the cylinder 10, there is liquid introduced therein by removing a filler plug 24 screwed within the upper end of the inner cylinder. The level of the liquid is always in the inner cylinder above the piston 14, while the inner cylinder also contains compressed air active on the liquid and admitted in the cylinder through an air valve 25.

Referring now more particularly to the invention, the packing structure 21 is preferably sleeve-shaped having an internal wall 26 made of resilient or flexible material such as rubber and formed with longitudinally spaced ring-like lips 27 capable of fluid tight engagement with the inner cylinder 11. The external wall 28 of the packing is preferably made of the same material as that of the wall 26, and is formed with lips 29 similar to the lips 27. Extending longitudinally through the packing or more particularly between the walls 26 and 28, there is a rigid sleeve or core 30 preferably made of rigid material such as steel to the interior and exterior of which are permanently attached the walls 26 and 28 respectively, which walls may be glued or vulcanized to the sleeve 30 to form therewith a single unit. The rigid sleeve 30 is mounted to extend from one to the other end of the packing unit for the purposes hereinafter described.

Figure 4:
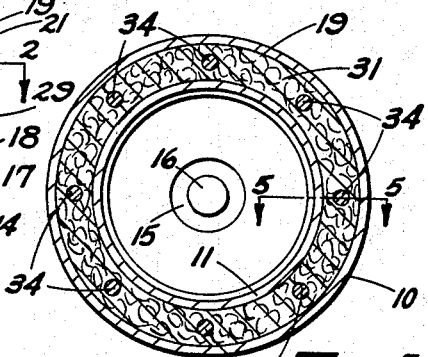
Fig. 4 is a view similar to Fig. 2, illustrating a modification of the invention.
Figure 5:
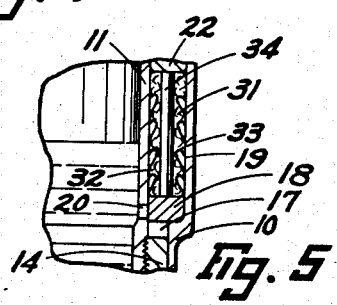
Fig. 5 is a longitudinal sectional view taken in a plane indicated by line 5—5 in Fig. 4.

In the modification of the invention shown in Figs. 4 and 5, the packing structure includes a sleeve-like member 31 made of resilient material such as rubber, and having its inner and outer surfaces formed with lips 32 and 33 similar to the lips 27 and 29 of the packing unit 21. Extending longitudinally through the wall of the member 31, there is a plurality of equally spaced metal pins 34 which may be vulcanized or otherwise secured in position and made to extend from one to the other end of the member 31.

In operation, relative telescoping movements of the cylinders 10 and 11 resulting from the landing or taxiing of the craft, are normally checked by the displacement of the liquid through the orifice 15 metered by the tapered pin 16. When the compressing load is removed from the strut, that is, when the craft has left the ground, the weight of the landing wheel carried by the outer end of the cylinder 10 together with the action of the compressed air stored within the inner cylinder 11 above the liquid, will cause the extension of the strut which is limited by the engagement of the piston 14 with the retainer 18. Heretofore, the piston engaging the retainer would cause the load to be transmitted to the packing, resulting in the axial compression of the packing and often subject it to such deformation tending to injure the same. To overcome this disadvantage, it has been the practice to secure the retainer 18 rigidly to the outer cylinder by any suitable means such as a screw connection or the like, thereby preventing the thrust of the piston 14 on the retainer to be transmitted to the packing. In the present construction, the thrust of the piston 14 transmitted to the retainer 18 is resisted by the core 30 of the packing unit 21, thereby preventing axial deflection of the packing walls 26 and 28 while affording a positive stop to limit the extension stroke of the strut. By using this novel packing, the retainer 18 may simply rest on the bottom of the counterbore 19 without necessitating a special connection while preventing the packing member from being subjected to axial movement.

In the modification shown in Figs. 4 and 5, the axial thrust of the piston 14 is resisted by the pins 34 in the manner above referred to in connection with the core 30.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

A packing structure for operation between two telescoping elements including a sleeve-shaped member made of flexible material, longitudinally spaced lips formed on the inner and outer surfaces of said member, and a rigid sleeve mounted concentrically in the wall of said member and extending from one to the other longitudinal end thereof.

JOHN F. WALLACE.